US010282752B2

(12) United States Patent
Athsani et al.

(10) Patent No.: US 10,282,752 B2
(45) Date of Patent: May 7, 2019

(54) COMPUTERIZED SYSTEM AND METHOD FOR DISPLAYING A MAP SYSTEM USER INTERFACE AND DIGITAL CONTENT

(75) Inventors: Athellina Athsani, San Jose, CA (US); Elizabeth F. Churchill, San Francisco, CA (US); M. Cameron Jones, Seattle, WA (US)

(73) Assignee: EXCALIBUR IP, LLC, New York, NY (US)

( * ) Notice: Subject to any disclaimer, the term of this patent is extended or adjusted under 35 U.S.C. 154(b) by 848 days.

(21) Appl. No.: 12/467,189

(22) Filed: May 15, 2009

(65) Prior Publication Data

US 2010/0293035 A1 Nov. 18, 2010

(51) Int. Cl.
*G06Q 30/00* (2012.01)
*G06Q 30/02* (2012.01)
*G06Q 30/04* (2012.01)

(52) U.S. Cl.
CPC ......... *G06Q 30/0257* (2013.01); *G06Q 30/02* (2013.01); *G06Q 30/0261* (2013.01); *G06Q 30/0264* (2013.01); *G06Q 30/04* (2013.01)

(58) Field of Classification Search
CPC ............................... G06Q 90/00; G06Q 30/02
USPC ........... 705/14.1, 14.49, 14.58, 14.64, 14.66, 705/14.67
See application file for complete search history.

(56) References Cited

U.S. PATENT DOCUMENTS

| | | | | |
|---|---|---|---|---|
| 6,594,640 | B1 * | 7/2003 | Postrel | G06Q 20/06 705/14.27 |
| 7,136,875 | B2 * | 11/2006 | Anderson | G06Q 30/02 |
| 7,455,226 | B1 * | 11/2008 | Hammond | G06Q 10/087 235/385 |
| 7,574,530 | B2 * | 8/2009 | Wang | H04W 4/02 709/245 |
| 7,647,278 | B1 * | 1/2010 | Foth | G06Q 20/10 380/270 |
| 7,983,949 | B1 * | 7/2011 | Joseph | G06Q 30/02 382/109 |
| 8,175,921 | B1 * | 5/2012 | Kopra | G06Q 30/02 705/14.57 |

(Continued)

OTHER PUBLICATIONS

Anonymous. (2008). "Community Walk—Make Your Own Map, Build Interactive Maps, Create a Map With Photos, Videos, more," located at <http://www.communitywalk.com/>, last visited on Apr. 25, 2008, one page.

(Continued)

*Primary Examiner* — Luis A Brown
(74) *Attorney, Agent, or Firm* — James J. DeCarlo; Greenberg Traurig, LLP

(57) ABSTRACT

In the Internet field, interfaces which support social interaction are used by two or more people to share information and content. An example is a geolocation (map-type) interface (a web page for instance) which is relied upon by users to obtain travel routes, plan trips and find geolocation information, such as stores, restaurants and other places. Described here is a system for advertising whereby targeted advertisements are displayed to users of such an interface and the advertisements are the result of an analysis of user behavior during a particular interface session or several sessions, so advertisements are closely targeted to each particular user.

18 Claims, 8 Drawing Sheets

(56) References Cited

U.S. PATENT DOCUMENTS

| | | | | |
|---|---|---|---|---|
| 8,195,133 B2* | 6/2012 | Ramer | | G06Q 30/00 455/414.1 |
| 8,583,668 B2* | 11/2013 | Higgins | | G06Q 30/02 707/758 |
| 8,588,816 B2* | 11/2013 | Collins | | G06Q 30/02 455/456.3 |
| 8,635,106 B2* | 1/2014 | Sarukkai | | H04W 28/06 455/414.1 |
| 8,655,381 B2* | 2/2014 | Maitland | | G06Q 30/02 455/456.1 |
| 2001/0054003 A1* | 12/2001 | Chien | | G06Q 20/04 705/14.17 |
| 2002/0026348 A1* | 2/2002 | Fowler | | G06Q 30/02 705/14.11 |
| 2002/0055933 A1* | 5/2002 | Feathers | | G06Q 30/02 |
| 2002/0081020 A1* | 6/2002 | Shimazu | | 382/154 |
| 2002/0082920 A1* | 6/2002 | Austin | | G06Q 30/02 705/14.25 |
| 2002/0095333 A1* | 7/2002 | Jokinen | | G06Q 30/02 705/14.26 |
| 2002/0165769 A1* | 11/2002 | Ogaki | | G06Q 20/20 705/14.36 |
| 2002/0169770 A1* | 11/2002 | Kim | | G06F 16/355 |
| 2003/0061211 A1* | 3/2003 | Shultz | | G06Q 30/02 |
| 2004/0059708 A1* | 3/2004 | Dean | | G06Q 30/02 |
| 2004/0093327 A1* | 5/2004 | Anderson | | G06Q 30/02 |
| 2004/0122736 A1* | 6/2004 | Strock | | G06Q 30/02 705/14.31 |
| 2004/0143518 A1* | 7/2004 | Siegel | | G06Q 10/087 705/28 |
| 2004/0172260 A1* | 9/2004 | Junger | | G06Q 10/0833 705/21 |
| 2005/0071228 A1* | 3/2005 | Bortolin | | G06Q 20/387 705/14.27 |
| 2005/0075931 A1* | 4/2005 | Pearson | | G06Q 30/02 705/2 |
| 2005/0076097 A1* | 4/2005 | Sullivan | | G06F 16/954 709/218 |
| 2005/0131762 A1* | 6/2005 | Bharat | | G06Q 10/00 705/14.66 |
| 2005/0134449 A1* | 6/2005 | Barile | | G06K 7/0008 340/505 |
| 2005/0159996 A1* | 7/2005 | Lazarus | | G06Q 30/02 705/7.31 |
| 2005/0160023 A1* | 7/2005 | Pearson | | G06Q 20/06 705/35 |
| 2005/0182677 A1* | 8/2005 | Hill | | G06Q 30/00 705/14.55 |
| 2005/0257400 A1* | 11/2005 | Sommerer | | G06F 16/954 36/13 |
| 2005/0289003 A1* | 12/2005 | Thompson | | G06Q 30/02 705/14.28 |
| 2006/0129426 A1* | 6/2006 | Pearson | | G06Q 20/06 705/2 |
| 2006/0235747 A1* | 10/2006 | Hammond | | G06Q 10/10 705/14.24 |
| 2007/0016462 A1* | 1/2007 | Atkinson | | G06Q 10/06 705/28 |
| 2007/0078714 A1* | 4/2007 | Ott | | G06Q 30/02 705/14.53 |
| 2007/0100867 A1* | 5/2007 | Celik | | G06Q 30/02 |
| 2007/0124201 A1* | 5/2007 | Hu | | G06F 21/10 705/14.2 |
| 2007/0156515 A1* | 7/2007 | Hasselback | | G06Q 30/02 705/14.27 |
| 2007/0156533 A1* | 7/2007 | Hammond | | G06Q 10/10 705/14.35 |
| 2007/0185768 A1* | 8/2007 | Vengroff | | G06Q 30/02 705/14.64 |
| 2007/0192189 A1* | 8/2007 | Popowich et al. | | 705/14 |
| 2007/0208616 A1* | 9/2007 | Choi | | G06Q 30/02 705/14.13 |
| 2007/0208879 A1* | 9/2007 | Liu | | G06Q 30/02 709/246 |
| 2007/0214040 A1* | 9/2007 | Patel | | G06Q 30/02 705/14.17 |
| 2007/0214041 A1* | 9/2007 | Patel | | G06Q 30/02 705/14.55 |
| 2007/0244741 A1* | 10/2007 | Blume | | G06Q 30/02 705/7.31 |
| 2007/0260514 A1* | 11/2007 | Burdick | | G06Q 30/02 705/14.46 |
| 2007/0260520 A1* | 11/2007 | Jha | | G06Q 30/02 705/14.44 |
| 2007/0271259 A1* | 11/2007 | Lee | | G06F 16/9537 |
| 2007/0288164 A1* | 12/2007 | Gordon | | G01C 21/20 701/469 |
| 2008/0052151 A1* | 2/2008 | Xie | | G06Q 30/02 705/14.54 |
| 2008/0086368 A1* | 4/2008 | Bauman | | G06Q 30/02 705/7.34 |
| 2008/0097846 A1* | 4/2008 | Oikawa | | G06Q 20/327 705/14.1 |
| 2008/0148175 A1 | 6/2008 | Naaman et al. | | |
| 2008/0154725 A1* | 6/2008 | Flake | | G06Q 30/00 705/14.35 |
| 2008/0196060 A1* | 8/2008 | Varghese | | H04N 7/16 725/34 |
| 2008/0214153 A1* | 9/2008 | Ramer et al. | | 455/414.1 |
| 2008/0262913 A1* | 10/2008 | Reitz | | G06Q 30/02 705/14.36 |
| 2008/0270235 A1* | 10/2008 | Yoon | | G06Q 30/02 705/14.58 |
| 2009/0024700 A1* | 1/2009 | Garg | | G06Q 30/02 709/203 |
| 2009/0076870 A1* | 3/2009 | Hammond | | G06Q 10/087 235/385 |
| 2009/0228325 A1* | 9/2009 | Simmons | | G06Q 10/06313 705/7.23 |
| 2009/0254824 A1* | 10/2009 | Singh | | G01C 21/3679 715/716 |
| 2009/0325595 A1* | 12/2009 | Farris | | H04W 4/20 455/456.1 |
| 2009/0325606 A1* | 12/2009 | Farris | | H04W 4/02 455/456.3 |
| 2009/0327151 A1* | 12/2009 | Carlson | | G06Q 30/02 705/80 |
| 2010/0080163 A1* | 4/2010 | Krishnamoorthi | | H04L 12/189 370/312 |
| 2010/0262456 A1* | 10/2010 | Feng | | G06Q 30/02 705/14.3 |
| 2010/0293035 A1* | 11/2010 | Athsani | | G06Q 30/02 705/14.58 |
| 2010/0324990 A1* | 12/2010 | D'Angelo | | G06Q 10/10 705/14.46 |
| 2011/0022455 A1* | 1/2011 | Wolf | | G06Q 30/02 705/14.27 |
| 2011/0184792 A1* | 7/2011 | Butcher | | G06Q 10/10 705/14.13 |
| 2011/0246287 A1* | 10/2011 | Wright | | G06Q 10/00 705/14.45 |
| 2011/0320250 A1* | 12/2011 | Gemmell | | G06Q 30/02 705/14.16 |
| 2012/0066035 A1* | 3/2012 | Stanger | | G06Q 30/0207 705/14.1 |
| 2012/0221392 A1* | 8/2012 | Baker | | G06Q 30/0207 705/14.17 |
| 2012/0221403 A1* | 8/2012 | Brown | | G06Q 30/02 705/14.35 |
| 2012/0323703 A1* | 12/2012 | Hillier | | H04W 12/04 705/14.73 |
| 2013/0013833 A1* | 1/2013 | Nagpal | | G06F 13/14 710/200 |
| 2013/0073389 A1* | 3/2013 | Heath | | G06Q 50/01 705/14.54 |
| 2013/0144674 A1* | 6/2013 | Kim | | G06Q 30/0207 705/7.19 |

(56) References Cited

U.S. PATENT DOCUMENTS

| | | | | |
|---|---|---|---|---|
| 2013/0281120 | A1* | 10/2013 | Oka | H04W 64/00 |
| | | | | 455/456.2 |
| 2013/0282472 | A1* | 10/2013 | Penilla | B60L 53/305 |
| | | | | 705/14.35 |
| 2013/0317944 | A1* | 11/2013 | Huang | G01S 5/0252 |
| | | | | 705/26.61 |
| 2014/0006209 | A1* | 1/2014 | Groarke | G06Q 40/02 |
| | | | | 705/26.61 |
| 2014/0046789 | A1* | 2/2014 | Baliga | G06Q 30/06 |
| | | | | 705/26.1 |
| 2014/0257955 | A1* | 9/2014 | Powell | G06Q 30/0233 |
| | | | | 705/14.23 |
| 2014/0315584 | A1* | 10/2014 | Cheng | H04W 4/023 |
| | | | | 455/456.3 |
| 2017/0068984 | A1* | 3/2017 | Joshi | G06Q 30/0226 |
| 2017/0228756 | A1* | 8/2017 | Reimer | G06Q 30/0224 |
| 2017/0293932 | A1* | 10/2017 | Clark | G06Q 20/10 |
| 2018/0260833 | A1* | 9/2018 | Khan | G06Q 20/322 |

OTHER PUBLICATIONS

Anonymous. (2008). "Geography 2.0: Virtual Globes," located at <http://geography2.blogspot.com/2006/03/conversations-with-maps.html>, last visited on Apr. 25, 2008, three pages.

Anonymous. (2008). "GIS Planet: Geochat Room," located at <http://gisplanet.blogspot.com/2007/10/geochat-room.html>, last visited on Apr. 25, 2008, four pages.

* cited by examiner

COMPUTERIZED SYSTEM AND METHOD FOR DISPLAYING A MAP SYSTEM USER INTERFACE AND DIGITAL CONTENT

FIELD OF THE INVENTION

This disclosure generally relates to the Internet and similar communications networks and more particularly to Internet community communication and Internet advertising.

BACKGROUND

Commonly owned U.S. patent application Ser. No. 12/098,326, inventor Elizabeth F. CHURCHILL, filed Apr. 4, 2008, incorporated herein by reference in its entirety discloses what is referred to as "MapChat". This Internet based information communication technology is operable to provide users with means for sharing location relevant information such as maps, routes, events and place recommendations. Such a map and event planning information communication technology provides a means for participants to place "chat" (Internet text two-way or multiple-way communication) comments on an interactive computer map that participants can edit and collaboratively work with to decide on a suitable meeting location. Embodiments allow synchronous conversation via text, voice, video or sound by providing multiple chat "bubbles" from different users to be available on a displayed map simultaneously thereby allowing meetings to be arranged dynamically. It is to be understood that this is carried out in the context of conventional Internet technology including a host server and client software (e.g. a browser or equivalent) available to each user running on a client computer platform. Such a geolocation interface is an example of interfaces which have the aspect of accommodating social interaction between people. Other examples of such interfaces are Yahoo! Flickr™ for sharing photos and Adobe Acrobat Connect for web conferencing. Most such "social" technologies like Flickr and Facebook are social and interactive, but they differ in the extent to which they allow annotation of the rendered content by one or more agents (human or machine). For example, on Flickr, the interactions are limited to comments below the picture and notes on the picture. The Mapchat system allows comments by people on map locations, annotations that indicate relevance that are generated in response to user generated queries (the arrows/pushpins), and also allows insertion of ad content algorithmically.

One version of MapChat includes a map information communication system for providing an interactive graphic suitable for presentation on a webpage display and receiving a first text string that is a message from a first user who is one of several users, wherein that text string or message is associated with a particular location on the interactive graphic (map). See present FIG. 1 identical to FIG. 1 of that patent application and which illustrates as a block diagram the MapChat map information communication system 100. This is in the context of the Internet where system 100 includes a conventional client web browser or equivalent user software running on a user computer platform and a server or host 104. Generally the client or plurality of clients 102 access the server 104 via the communications network 106, typically the Internet. The server 104 and client 102 are conventionally computing type devices of the type well known, but not restricted of course to personal computers and may include a desktop computer, laptop computer, mobile device such as a mobile telephone, a kiosk, a web enabled telephone, a smart phone, and the like.

Client 102 includes a software module that may operate on various devices such as a mobile device such as a cell telephone, desktop computer, overhead monitor, kiosk or other devices that may display computer imagery. The client 102 typically includes an interface 108 which includes a map and commentary selection webpage or component 110. It is to be understood that this client is actually running within the context of a conventional web browser or browsing user interface and typically no specialized software is operable on the client computer platform. The client 102 includes an interface 108 which includes a map as displayed on the computer screen of the user's computer and a commentary selection webpage or component 110.

Server 104 is programmed to format data, access from local or remote databases or other sources of data for presentation to the user 101 of client 102. Server 104 utilizes various conventional web data interface techniques. Typically server 104 is a computer program operating on a computer server platform. It is to be understood that server 104 is not necessarily a single computer or single server platform, but may be a plurality of same. Server 104 in this case includes instant message (IM) spooler 116 operable to provide instant messages, a local information database 118, a map database 120, an instant message bubble generator 122, a meta-data generator 124, a map information page generator 126, a search results database 128, and a rendering engine 130.

Instant message spooler 116 is operable to provide instant messages from other users. These users are typically selected by user 101 to have access to maps selected by user 101. Instant message spooler 116 is operable to receive instant messages from the other users and transmit them to the instant message bubble generator 122 for viewing. Messages may include text, voice, video or sound, as well as still images.

Local information database 118 stores information on, for example, geo-located activities and organizations such as stores, restaurants, and other places which may have a particular location. "Geolocation" here refers to a location which may be indicated on a map. This information may be locally stored or referenced from other services. Maps database 120 conventionally stores on-line maps that can be used by the user for reference and discussion with other users. The maps are, e.g., typographical, roadmaps, street maps, reference, maps, satellite photos, documents, and the like.

Instant message bubble generator 122 receives instant messages from the instant message spooler 116, associates the messages with a map location, stores a log of the messages, and sends the messages to the meta-data generator 124 for preparation for presentation by rendering engine 130 as a chat bubble on the map at the specified map location.

Map information page generator 126 can encapsulate map information with interaction display elements suitable for display on a map. For another example, a text bubble data structure may encapsulate map related discussion and data such as timestamps, communication identifiers, geo-position, and map identifiers.

The meta-data generator 124 may encapsulate data from the instant message bubble generator 122 and map information page generator 126 into meta-data of map visible structures to show on a displayed computer map. The meta-data generator 124 can then send the meta-data to the rendering engine 130 for presentation to the user 101.

Rendering engine 130 receives meta-data encapsulated and collated from the above sources 116, 118, 120, 122, 124, 126, and 128 by the meta-data generator 124, and presents them on the interface 108 of client 102. Rendering engine 130 creates a graphical representation on the map that is then associated with the meta-data. The rendering engine 130 registers the selected map location selections when the user activates or clicks on the map on his/her display 110 and uses this meta-data to place a bubble which is populated with map discussion contents on the displayed map.

Present FIG. 2, taken from the same MapChat patent publication, illustrates an exemplary map information communication user interface 200 which would be displayed by map and commentary selection webpage 110 of FIG. 1 to the user. This interface or display or screenshot includes a product identity area 202 and interactive map display area 204 and a comment log area 206. Shown here are chat bubble 212 and second chat bubble 214. The comment log area 206, also referred to as a "chat log", is the comments by the user and any other users in a time sequential order, such as a user comment 208 and a second user comment 210.

FIG. 3, taken from the same patent publication, is an illustration of exemplary map information communication interface 300, in other words a computer display for the user similar to 200 in FIG. 2, again showing a map information communication interface or webpage appearing on a display of a client 102 device or platform. This has a number of elements similar to FIG. 2. Included here are a comments chat log area 302, a search results area 306, an interactive map display area 308, an invite button 310, search area 311, detailed location information area 320, and chat bubble 330.

SUMMARY

The present disclosure is directed to an improvement on the above disclosed types of social interactive systems by incorporating therein targeted advertising. Advertising is a primary means of generating revenue via websites and hence there is a general goal to introduce advertising to every possible commercially supported website or Internet service. A goal here is to target advertising to particular users in an intelligent fashion so that the advertising is actually of interest to particular recipients rather than merely broadcasting advertising as is typically done in radio, television, newspapers and Internet "banner" advertising. It is well known that advertisers will pay much more for advertisements which are so targeted. Social interactive user interfaces such as MapChat, but not so limited, are increasingly common since Internet users rely on them to share information and content and hence they represent an avenue for advertising.

The present disclosure describes a method and apparatus to include advertising on these social interactive interfaces (web pages/web sites) by creating an advertising system associated with such interfaces. The present invention is not limited to use with MapChat, but also operates with other social interactive type interfaces, as mentioned above. Although examples here are map based, in accordance with the invention the background over which users chat may include other kinds of content or image maps—e.g., architectural drawings, products such as cars, etc. Hence any location related image content that users may want to talk about is possible in accordance with the invention.

The present disclosure is directed to using social interactive based interfaces and especially those which include what is referred to in the field as "user generated content" (UGC) by providing advertising based on data derived from user activity or content displayed on such interfaces. UGC is a well known term in the field and generally refers to text, voice, image, or video material generated by website or Internet users rather than that generated by commercial or other organizations which operate a website or service. For instance in FIG. 2, bubbles 212 and 214 are user generated content, being text comments by various users. The same is true of elements 330 and 304 in FIG. 3. These are distinct from the other elements shown in these figures which are typically downloaded from the website such as the map itself and the listing 306 of sushi restaurants with the added information 320 pertaining to entry "A" in listing 306, all of which are commercially provided and hence not user generated content.

The present invention is directed to both to a method and apparatus for providing directed advertising in the context of social interactive interfaces and user activity pertaining to those interfaces. Hence contemplated is a computer based system including the host server(s) and clients, the server platform which is a particular programmed computer, the software operable on the server platforms(s) which is typically stored in a computer readable medium, that is computer memory, and which includes computer code which when executed carries out activities to support the present system. The client software may be a web browser or equivalent user interface or a more specialized software application and is linked to the host via the Internet or other communication network.

DETAILED DESCRIPTION

Figure 1:
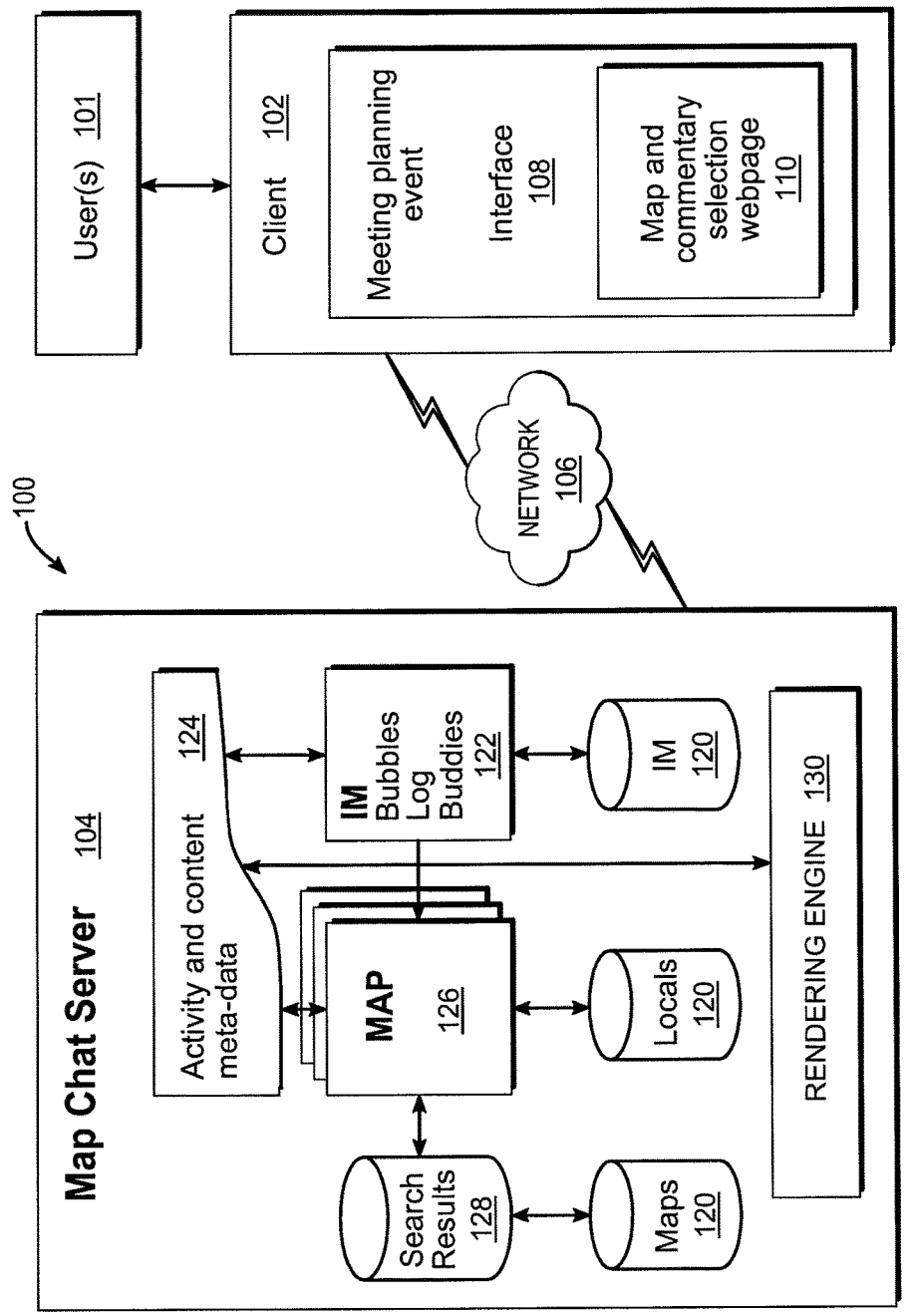
FIG. 1 shows in the prior art a system for a geolocation interface.

The present computer based system, referred to here as a social interactive advertising system interface, allows users to create, edit, and interact with what is referred to here as user activity "bundles" and thereby provides targeted advertisements to users by accessing data from the interactive communication systems of the users with explicitly and implicitly generated bundles. The users create or edit content which is user generated content as indicated above. "Bundle" in this context generally refers to user social interaction data such as a record class (that is, of computer data) where each entity within the bundle has associated meta-data that can be used by the system to determine affinity or relevance or semantics, typically in a matrix analysis relevant to user activity. Semantics, in this context, refers to the relationships between terms, entities, objects, etc.—that is how they are related, given the current user activity and thus what user intents can be inferred based on the user's current use of the application. E.g., in the context of a mapping application, a location including an airport might be semantically associated with travel. A park has a semantic association with leisure activities, perhaps children, etc. Matrix here simply means many-to-many relationships.

Once such a bundle is created and stored it can be used in the future; that is, bundles are not user session-limited. A bundle can serve as a template of prior user behavior to be applied to future user behavior, that is in other user sessions. In one embodiment a bundle is an aggregation of identifiers e.g., URLs (uniform resource locators), map co-ordinates, product identifiers, and annotations. Bundles are generated sets of resources and annotations, where users actively compile resources and add comments and/or annotations to them. Collectively, the set of resources and annotations is a bundle which represents a semantic intention—e.g., positive recommendations, negative recommendations, preferences, etc. User selected preferred items are placed in bundles by users, therefore these are more highly rated. The bundle is all of a person's preferred places, vendors, etc. So given these are "bookmarked" together by a user with a title like "Best Comic Book Stores", one has the semantic relationships between the stores themselves, their locations and the title "Best Comic Book Stores".

Bundles combine logged activity and profile data for individual users relevant to the task context. In one example here that context is event planning with respect to a geolocation, but a task context could be e.g., planning a house extension in the above architectural drawing example where the background image or content is architectural drawings and not a map. A bundle consists of explicitly selected recommendations for others by the user. Thus in one example the user creates a map related bundle called "Shopping in San Francisco". Using MapChat, because it is a chat system, that bundle is likely to be created to be shared with others the user knows or imagines—that is, the user creates the bundle for friends, or family, or friends who are visiting from another city. Each one of those subgroups may have a bundle that consists of different activities the user would recommend for them to do—shoes, handbags and wine bars for female friends; toy stores and child friendly activities for family; and tourist attractions of the sporting variety for other friends.

Thus in the act of creating a bundle, the user employs his/her specialized behavioral targeting knowledge that is much more specific than the generalized aggregated behavioral targeting knowledge that is used to more generally target ads. If over time the system collects and builds a model of these kinds of recommendations, then the system also learns more sophisticated models of how items/activities are bundled for recommendation and what items/activities are successful or not, that is are clicked on and shared on or forwarded within groups of friends and family or are sent out beyond the close familiar ties—"exported". The bundle therefore encapsulates the human-led behavioral targeting, harnessing users' knowledge of others to understand how different item/activities fit together.

The user has the ability to create user generated content, which is also a bundle, from his/her social interactive interface communication sessions. In another aspect, the system itself tracks or creates the bundles based on the user's activity, that is his/her interaction with the interface content and any user generated content he/she enters into the system. Each bundle can be created, viewed, edited, shared, or promoted.

Bundles may be commissioned by advertisers, or advertisers may give a reward to users who recommend their products successfully (as does viral advertising), or users can elect to offer space in their bundles for suitable advertisers—e.g., a user has a bundle on shopping in San Francisco, and would like to open up that bundle to independent designers to add their information to one's bundle. This is rather like Google Adsense allowing a user to only have ads for e.g. Prada on one's homepage. Recommendations between people may be important here.

In this context, revenue is generated from the advertising activity by providing to each particular user what is referred to as contextually relevant personally selected (i.e., by a person) ads based, in one embodiment, on social or affinity graphs. Such graphs are well known in the field of social networking. They are used in the context of the Internet and World Wide Web ("web") to express relationships between people expressed in terms of web activity, as well as relationships between web documents derived from the user interactive communication sessions or bundles or aggregated data collected during user interactive sessions or bundles. That is, a goal is to provide targeted ads to a user which relates to his/her user generated content and/or particular user behavior or his/her other activities such as for instance clicking on other ads. Hence it is possible to provide not merely for the advertising per se to be a source of revenue, but also it is possible to charge for creating, hosting, promoting the user bundles, or providing "tiered" bundle services which are a user paid bundle service in exchange for a user being free or partially free of advertising.

Typically the user data and metadata that goes into the bundles is derived from user activities conducted on the social interactive interface and from other user data such as user profiles (a set of personal information collected about each user as conventional in the field). There are a number of tiers of data relating to user activity here such as logged data of the user activity—clicks, etc. for example. Also there are elements the user actively puts in the items they select and the user's explicitly generated profile data. The system thereby determines targeted ads for each user. In one embodiment, the system mines data from the user interactive sessions, the data relating to the user activity or behavior or interaction and user profiles. Whatever the user adds to the bundle or indicates a preference for or shows a proclivity towards is an aspect of the user data. Also, the bundling capability is provided on the social interactive interface.

The present interface has in various embodiments the ability to search for locations or keywords or content, referred to collectively as "indexed objects"; to have an interactive communication system using for instance bookmarking; for users to export activities from the outside into the interface; and in the mapping context for users to track activities on a given map location via a user generated activity map.

The present system allows users to create and/or select bundles and activity based on the social interactive interface. It allows the system (or host server operator) to host and promote these user bundles and to create and make bundle recommendations based on aggregated data to users. It also allows users to obtain and recommend contextual advertisements on such interfaces based on their user data aggregated through the user bundles.

The system is able to track all user activity relevant to the content of the interface, that is user activity at the client, and interpret this data to provide target ads to that user at a fine grain level. That is, the system derives contextually relevant advertisements for the user from a large database of advertisements at the appropriate time as the user engages in activity using the interface. This advertisement matching is done using combinations of keyword and keyword clusters and social affinity algorithms, and linguistic relevancy "mashups" (content matching). These include known techniques for data analysis and mining techniques for personal relationships using e.g. user personal profiles and the bundles and social network analysis. Such analyses often use correlation indices to determine relevancy (affinity). In addition to the known techniques for generating affinity between people, these techniques are essentially about establishing affinity between people and places and things, and between people and things/places in different subgroups. An adult user is more likely to want to know about children's shows when chatting with his/her family than when talking to friends when instead the user would like to have affinity recommendations for, e.g., snow sports.

In one embodiment, the system allows users to establish interactive communication sessions with multiple nodes or points of contacts on the interface. For instance in the mapping (MapChat) context, a chat session is not limited to a particular map location. These communication sessions may use user generated content such as a chat (audio, video, text, images), searching, bookmarking, multi-node map interaction windows and other features. The user can bookmark, save, edit or view all or portions of the information exchanged from his/her MapChat sessions into a bundle. The system tracks activity by the user and converts this data into matrixes by storing and analyzing the number of impressions, user clicks (mouse clicks), clickthroughs, duration or frequency of viewing, user preferences occurring during sessions, and bookmarking.

Figure 4:
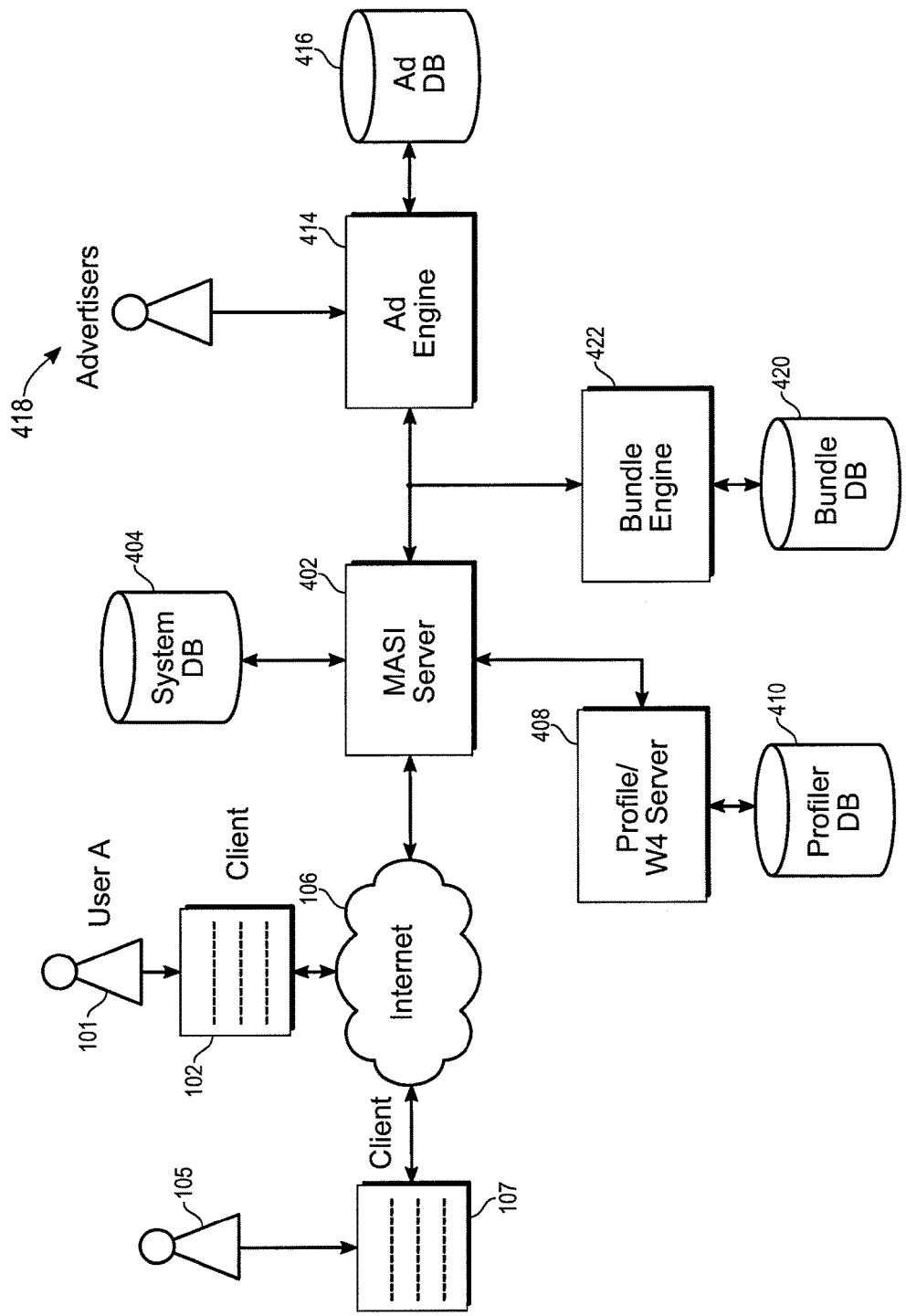
FIG. 4 shows a system in accordance with the present invention.

Present FIG. 4 shows an embodiment of the present system in block diagram form to explain its components. This is along the same lines as FIG. 1. Shown here on the client (user) side is a second user 105 and his/her client software/platform 107, coupled conventionally to the Internet 106.

On the "head end" (host) side, a map advertising system interface server (MASI) 402 is coupled to the Internet 106 and has an associated system database storage 404. Server 402 performs the role at the MapChat server 104 of FIG. 1 with additional functionality as explained below.

Also provided coupled to MASI server 402 are an advertisement server (engine) 414 and an associated advertisement database (storage) 416 storing a number of advertisements (or advertising copy) in the form of text, images, video, sound, etc., as is typical in the Internet field for advertising as supplied by the advertiser(s) 418. Advertisement server 414 serves the advertisements ultimately to the users via the clients 102, 107. Also included here is bundling engine (server) 422 which interacts with the advertisement server 414 and performs the above identified bundle related tasks of analyzing the user behavior in terms of interaction with a map and selecting a suitable targeted advertisement to the user at the correct time and of the correct content as identified by the above techniques using affinity, relevance and semantic approaches relating to the user data. Bundling server (engine) 422 also creates the bundles, see FIG. 5. Typically the advertisements themselves (or more accurately, the advertising content or copy) are classified by the advertisers 418 (such as by keywords or more sophisticated techniques) so they can be suitably found by advertisement server 414 and matched to user behavior.

Figure 5:
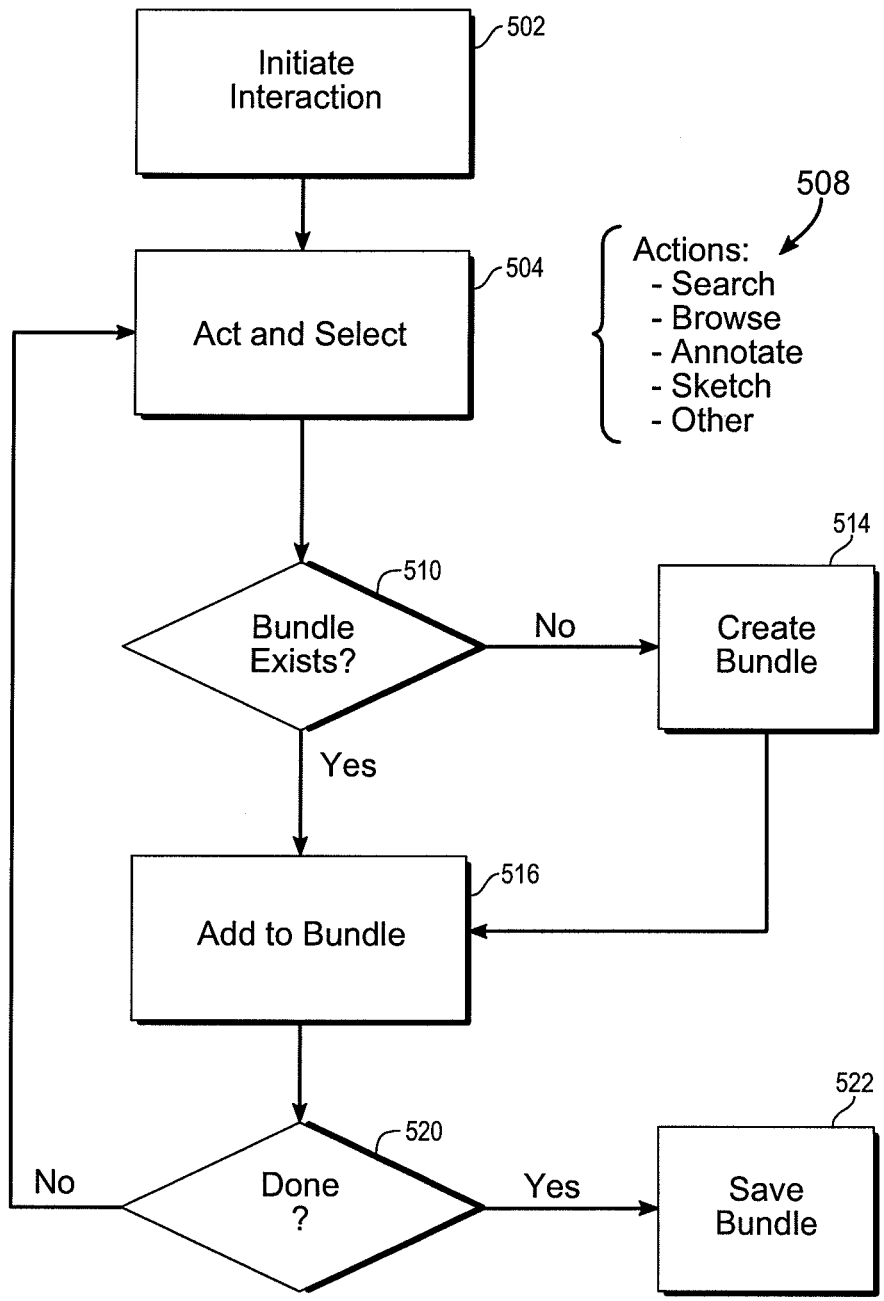
FIG. 5 shows in a flowchart creation of an exemplary bundle.

FIG. 5 shows in flowchart form how a bundle is created by the software executed by bundling server (engine) 422 and the bundle is stored in the associated database 424. The construction of a bundle is initiated at step 502. Next at step 504, from a set of (exemplary) user actions 508 which include searching, browsing, annotating, or sketching one such action is selected for a particular bundle. At step 510, the software checks to see if that particular bundle was earlier created (and stored in database 424). If no, at step 514 the new bundles is created. If yes, at step 516 the new activity is added to the existing bundle. At step 520, if no new activity is present ("done"), the bundle is saved to database 424 at step 522. If not done, control returns to step 504.

Further as regards the bundles, bundles may be exported as described above. In exporting the bundle is serialized into a format for transmission/migration between sessions within the system, or syndication across the web, or downloading to mobile devices. Export does not necessarily mean leaving the context of the system. It includes moving from one interactive session to another, or sharing with other users within the same system. However, there are numerous other target destinations including, but not limited to: mobile devices (cell phones, smart phones, PDAs, etc); offline/archival storage formats (XML, PDF, HTML, etc); third party services and sites (e.g., blogs); printable formats (PDF, HTML); syndication (RSS, ATOM, OPML); or proprietary binary formats.

A bundle may be created or structured so it automatically adds itself to (is associated with) advertisements from the advertising engine 414. Alternatively, advertisements may be added to a bundle by a human operator. As mentioned above, a "premium service" bundle (which carries a user fee) may be provided with no advertisements. Further, advertisements may be added to a bundle on the basis of a bundle download. If a bundle is exported to an external system or device, advertisements can be added to the bundle at download time. For example, if a user downloads a bundle of recommended destinations for a visit to San Francisco to his/her mobile computing device, ads for businesses and services in the San Francisco area are added to the bundle and displayed on his/her mobile device when the bundle is later opened and viewed (possibly in the absence of a live Internet connection).

Alternatively, "hooks" for ads may be added to the bundle so that the ads may be dynamically added/updated from an Internet-connected device when the bundle is later opened and viewed. The bundles may include user rewards based on user purchasers of advertised goods or services, or a user clicking on an advertisement. ("Clicking" here refers to a selection by a user via a user interface, such as by a mouse or equivalent.) The rewards are, e.g., monetary or discounts. A user may add keywords to a bundle or invite advertisers to his/her bundle.

The actual advertising matching may be done in one of several exemplary ways. One is to use conventional Internet algorithmic ad matching by correlating the user bundle to the advertising content and associated advertising content metadata. Another way, referred to above, is to create a user premium bundle where the user pays for the privilege of limiting his/her exposure to advertising, in tiered fashion. This lets a user opt in or out of receiving certain types or classes of advertisements. A third way involves the user (or advertiser) creating a bundle for selective advertisements. (The user may be compensated for doing this.) It is also possible to blend the three ways.

Figure 2:
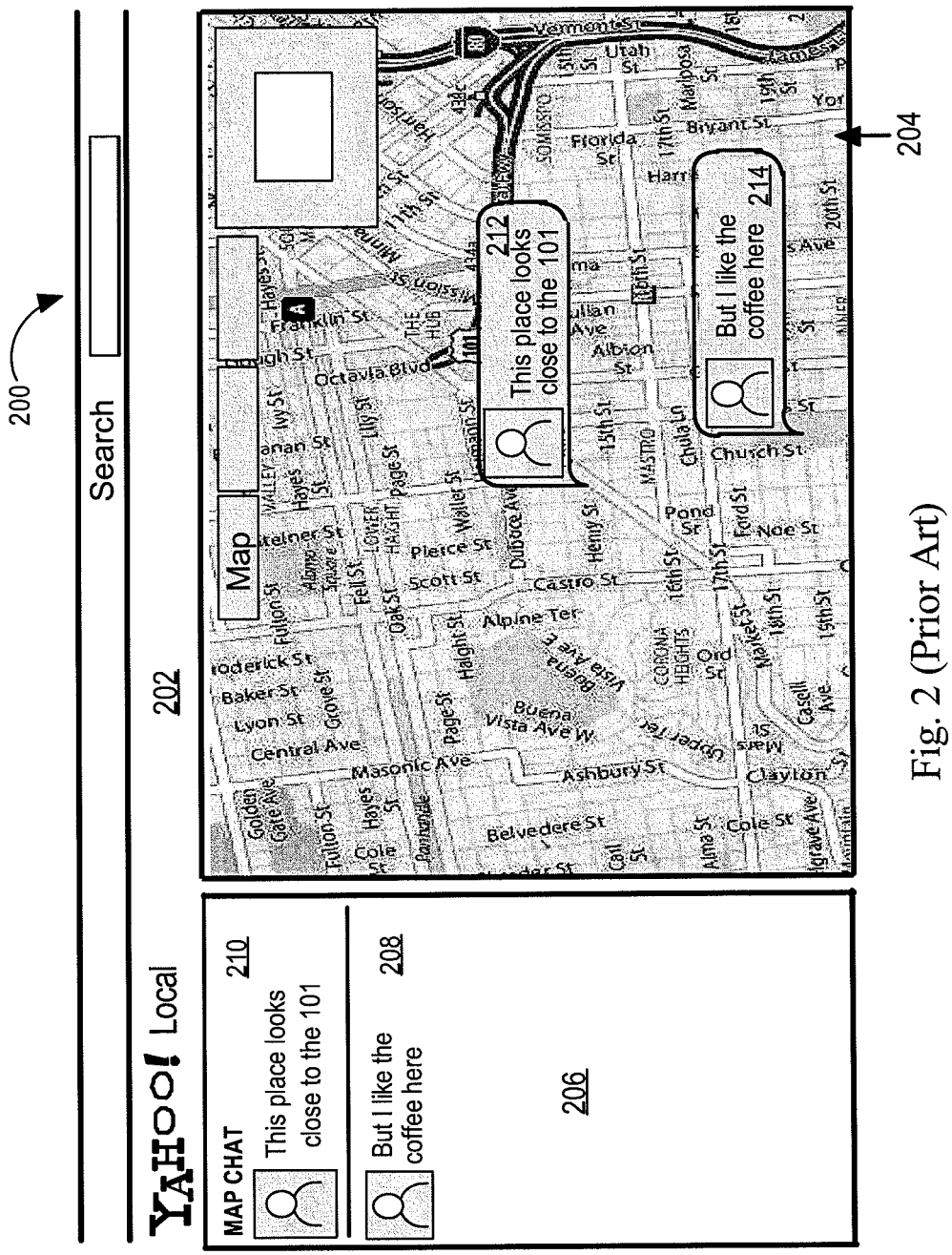
FIG. 2 shows a screenshot generated by the system of FIG. 1.
Figure 3:
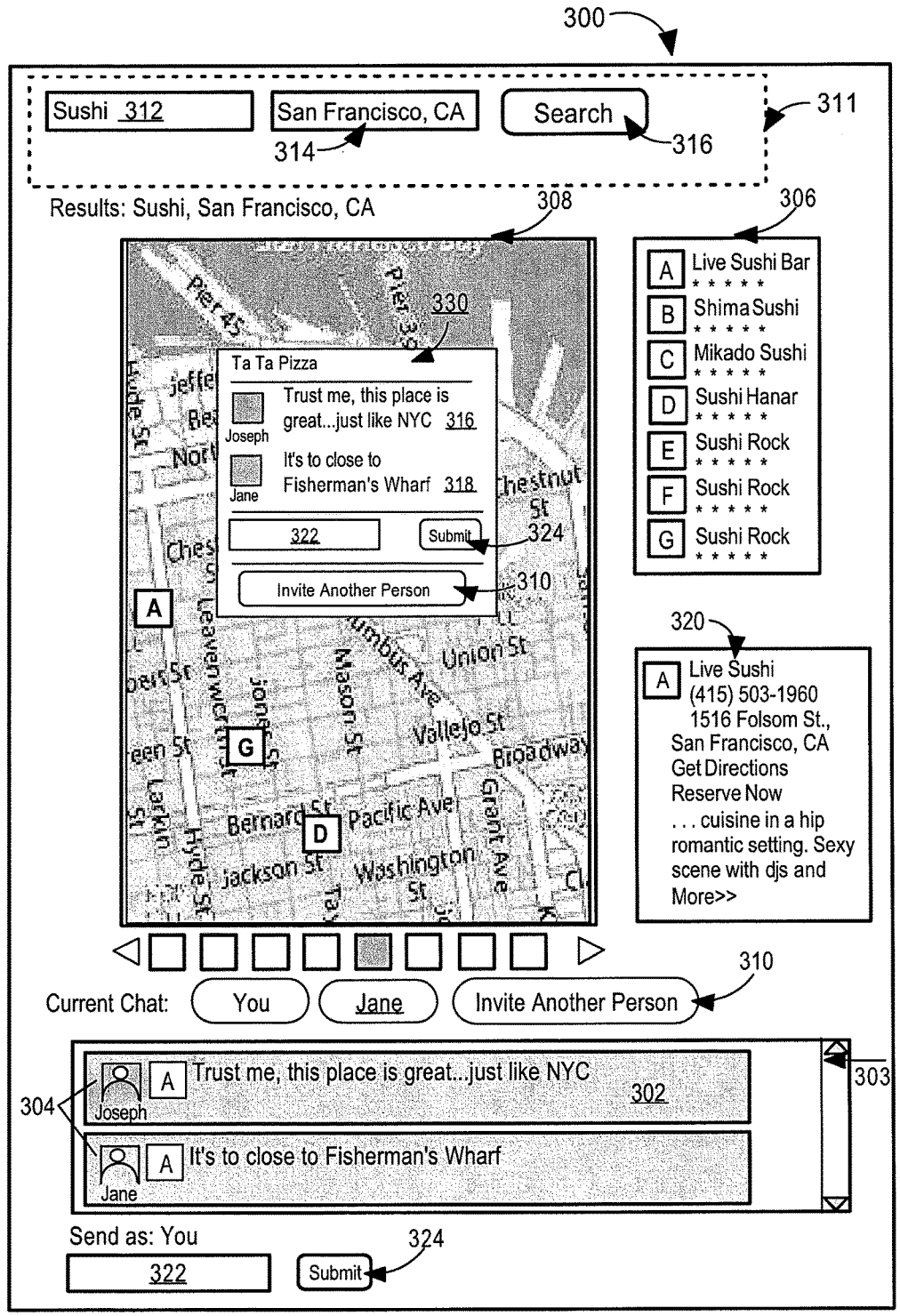
FIG. 3 shows another screenshot generated by the system of FIG. 1.
Figure 6A:
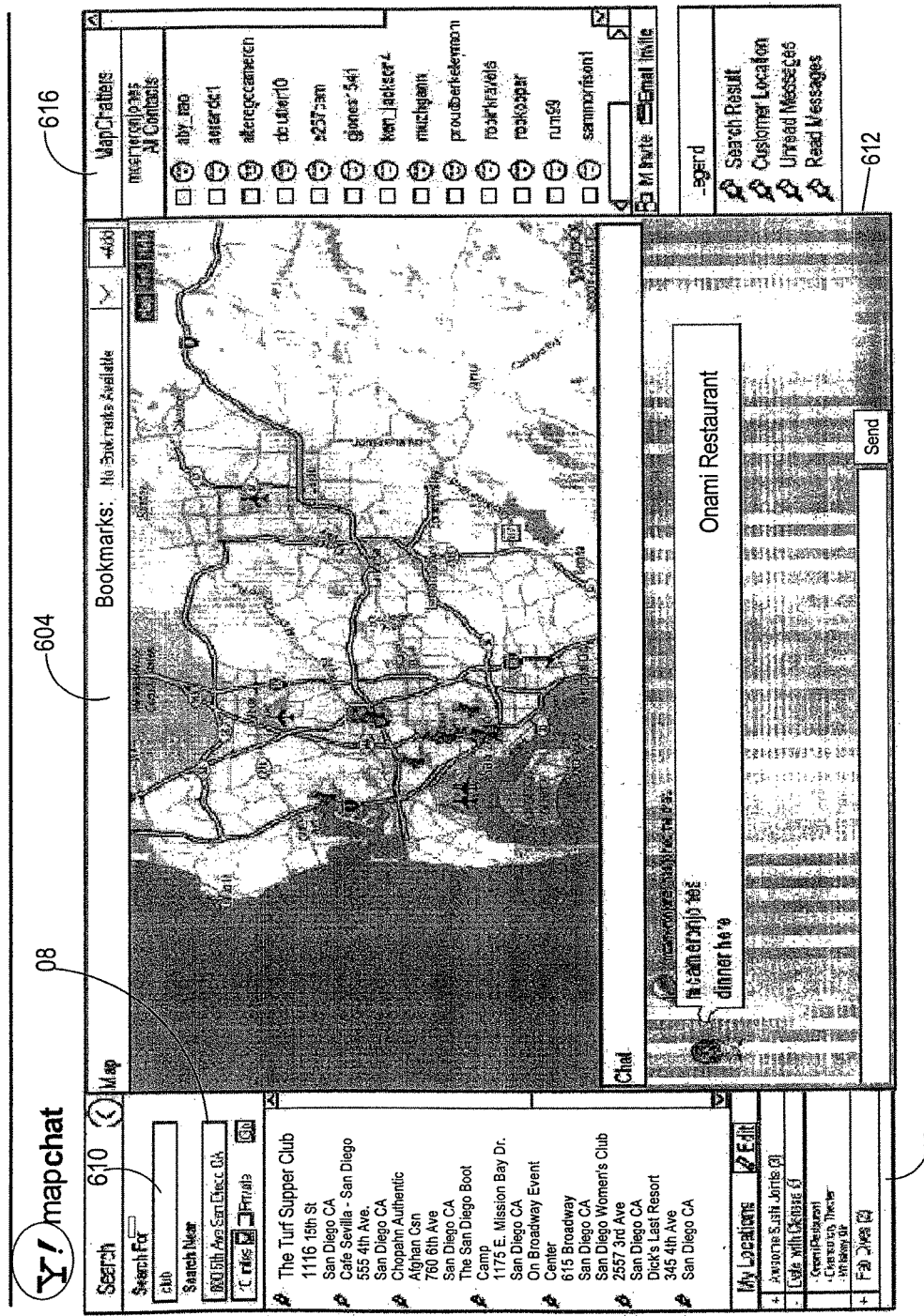
FIGS. 6A and 6B show screenshots generated by the system of FIG. 4 in accordance with the present invention.
Figure 6B:
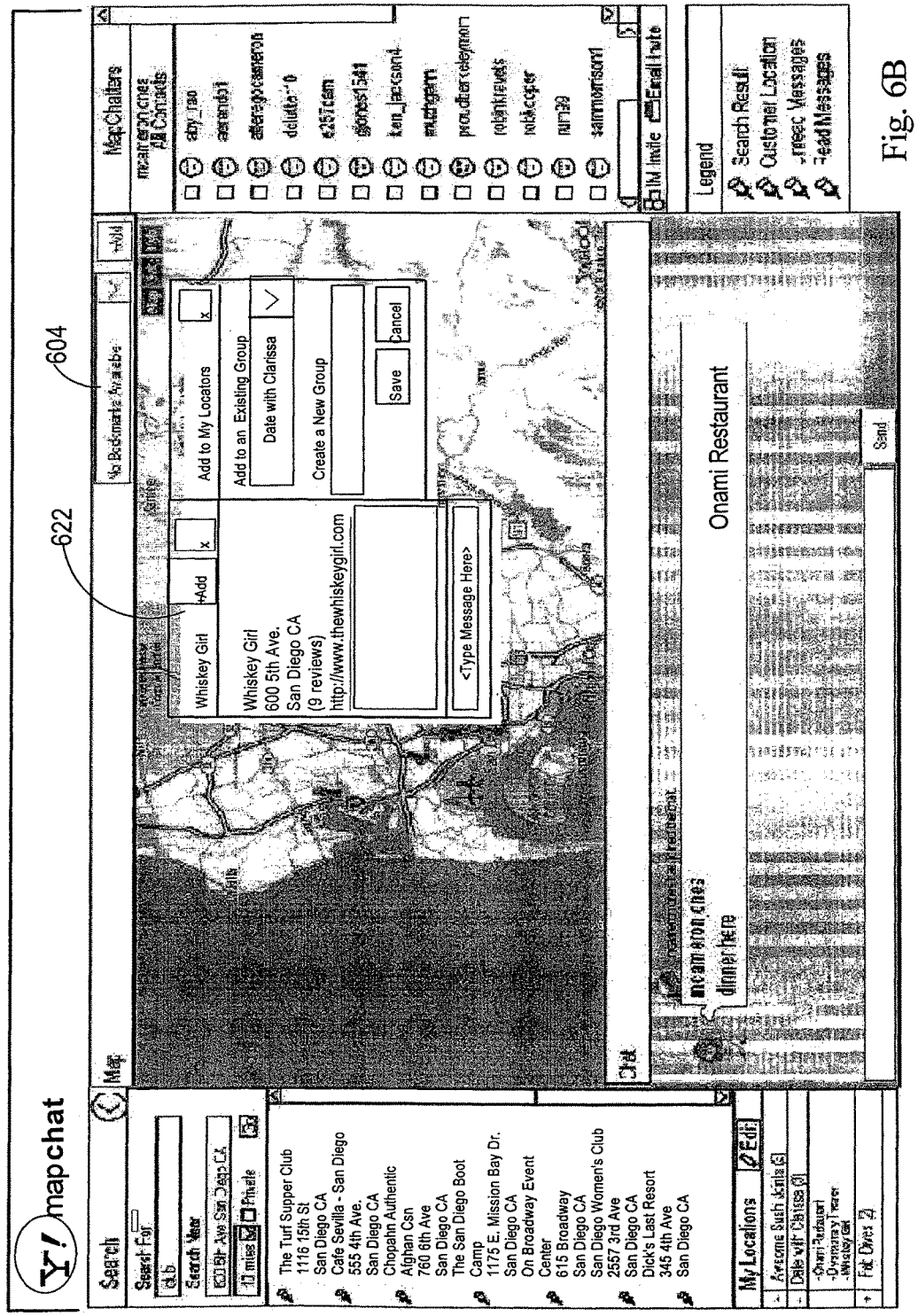

FIGS. 6A and 6B show two "screenshots" (map advertising interface web pages) provided to a user by the present system and analogous to FIGS. 2 and 3, but showing in addition to the conventional MapChat aspects, also "served up" advertisements as selected by the FIG. 4 system. In FIG. 6A, the served up advertisements are in panel 602, to the left of the map panel 604. The advertisements in panel 602 are in a simple list form of advertising businesses, in this case the geo-located result for both the location specified at 608 and the search term specified at 610 by the user. Panel 612 is the chat panel and the chat participants are listed in the rightmost panel 616. FIG. 6B is largely the same as FIG. 6A but with the addition of further advertising content at panel 622 specific to an advertised business and superimposed on the map panel. As shown panel 622 includes a hyperlink to the website for the advertised business.

With regard to advertising and placement of contextually relevant ads, there are different web page locations the ads may be placed—in a side panel, on the image/map, in the chat log, in the chat bubbles that are placed on the maps, into bundles in the bundle manager. Each one has different characteristics of what or when to display.

It is to be understood that the computer software described here is coded in any suitable computer language such as C++. Typically relevant computer software is executed by the processors associated server platforms of FIG. 4. Coding such software in light of this disclosure would be routine. The computer software itself is typically stored on a computer storage medium which is part of or coupled to the server platforms in the form of computer storage such as a disk drive, tape drive or semiconductor type memory. Typically this computer code is actually stored in the form of object code, which is compiled code, although it may be source code if the servers are secure. In terms of computer hardware, the various computer platforms here, including the servers and client server platform, are conventional as described below.

Figure 7:
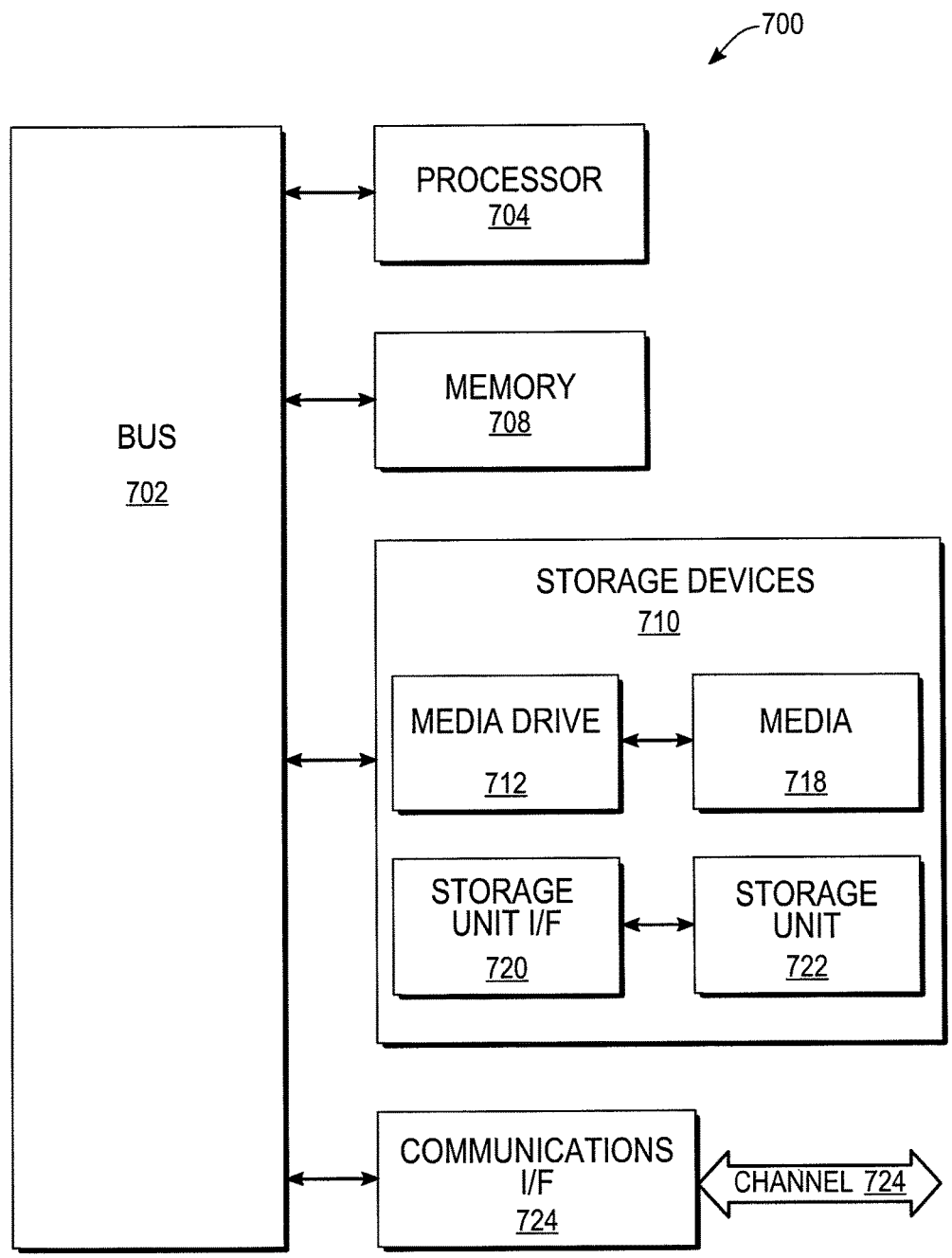
FIG. 7 shows a conventional computer system usable in the context of the present invention.

FIG. 7 illustrates a typical computing system 700 that may be employed to implement processing functionality in embodiments of the invention. Computing systems of this type may be used in the any one or more of the above-mentioned servers and user computer or computing devices, for example. Those skilled in the relevant art will also recognize how to implement embodiments of the invention using other computer systems or architectures. Computing system 700 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disk (CD) or digital versatile disk (DVD) drive (R or RW), or other removable or fixed media drive. Storage media 718 may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other network interface card (NIC)), a communications port (such as for example, a USB port), a PCMCIA slot and card, etc. Software and data transferred via communications interface 724 are in the form of signals which can be electronic, electromagnetic, optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as "computer program code" (which may be grouped in the form of computer programs or other groupings), when executed, enable the computing system 700 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of embodiments of the invention as described herein.

This disclosure is illustrative and not limiting; further modifications will be apparent to those skilled in the art in light of this disclosure and are intended to fall within the scope of the appended claims.

The invention claimed is:

1. A method comprising:

communicating, by a computing device over a communications network, at least one interface for displaying an interactive map, said interactive map comprising interactive data objects that are displayed and each correspond to a physical geographical location, said at least one interface comprising functionality for being displayed as a web page and supporting social interaction between users over a computerized social network;

receiving, over the network at the computing device, an input from a device of a user, the input corresponding to an interactive data object displayed on said interactive map, and comprising user generated content relating to a physical geographic location associated with said interactive data object;

associating, by the computing device, the user generated input with said interactive data object such that the user generated content is associated with said physical geographic location that is represented by said interactive data object;

accessing, by the computing device, social interaction data associated with the user, said accessing comprising analyzing said social interaction data based on said associated user generated input and said physical geographic location, and based on said analysis, determining a behavior of the user from said social interaction data that corresponds to the user generated input and said physical geographic location;

identifying, via the computing device, a digital media item comprising digital content provided by a third party, said identification of the third party digital media item based on said determined behavior; and communicating, by the computing device over the network, instructions associated with said third party digital media item to the user device, said instructions comprising modifications to the interactive map interface, said modifications causing a network-connected device associated with the third party to communicate the third party digital media item such that the previously communicated and displayed interactive map interface is dynamically updated and modified to add to the already displayed interactive map the third party digital media item in association with the interactive data object identified by said input.

2. The method of claim 1, wherein the behavior of the user relates to at least one of a keyword, user interaction data, and metadata associated with the user.

3. The method of claim 1, wherein the third party digital content comprises at least one of text, audio, an image, and video.

4. The method of claim 1, wherein the user input further comprises at least one of text, video, and audio.

5. The method of claim 1, wherein transmitting the third party digital media item comprises:

storing in a memory a plurality of third party digital media items; and a processor selecting from the memory one of the third party digital media items for transmission to the user.

6. The method of claim 2, further comprising:

generating a function of at least one of affinity, relevance and semantics from the metadata; and using the function as an expression of the behavior of the user.

7. The method of claim 6, wherein the function is a social or affinity graph.

8. The method of claim 1, wherein the user behavior comprises at least one of impressions, clicks, clickthroughs, duration of views, frequency of views, and preferences in a user session.

9. The method of claim 1, wherein the user behavior is over a plurality of sessions.

10. The method of claim 1, wherein the interface shares images or supports personal contacts.

11. A non-transitory computer readable storage tangibly encoded with computer-executable instructions, that when executed by a computing device, perform a method comprising:

communicating, by the computing device over a communications network, at least one interface for displaying an interactive map, said interactive map comprising interactive data objects that are displayed and each correspond to a physical geographical location, said at least one interface comprising functionality for being displayed as a web page and supporting social interaction between users over a computerized social network;

receiving, over the network at the computing device, an input from a device of a user, the input corresponding to an interactive data object displayed on said interactive map, and comprising user generated content relating to a physical geographic location associated with said interactive data object;

associating, by the computing device, the user generated input with said interactive data object such that the user generated content is associated with said physical geographic location that is represented by said interactive data object;

accessing, by the computing device, social interaction data associated with the user, said accessing comprising analyzing said social interaction data based on said associated user generated input and said physical geographic location, and based on said analysis, determining a behavior of the user from said social interaction data that corresponds to the user generated input and said physical geographic location;

identifying, via the computing device, a digital media item comprising digital content provided by a third party, said identification of the third party digital media item based on said determined behavior; and communicating, by the computing device over the network, instructions associated with said third party digital media item to the user device, said instructions comprising modifications to the interactive map interface, said modifications causing a network-connected device associated with the third party to communicate the third party digital media item such that the previously communicated and displayed interactive map interface is dynamically updated and modified to add to the already displayed interactive map the third party digital media item in association with the interactive data object identified by said input.

12. A computing device comprising:

a processor; and a non-transitory computer-readable storage medium tangible storing thereon program logic executable by said processor, said program logic comprising:

logic executed by the processor for communicating, by the computing device over a communications network, at least one interface for displaying an interactive map, said interactive map comprising interactive data objects that are displayed and each correspond to a physical geographical location, said at least one interface comprising functionality for being displayed as a web page and supporting social interaction between users over a computerized social network;

logic executed by the processor for receiving, over the network at the computing device, an input from a device of a user, the input corresponding to an interactive data object displayed on said interactive map, and comprising user generated content relating to a physical geographic location associated with said interactive data object;

logic executed by the processor for associating, by the computing device, the user generated input with said interactive data object such that the user generated content is associated with said physical geographic location that is represented by said interactive data object;

logic executed by the processor for accessing, by the computing device, social interaction data associated with the user, said accessing comprising analyzing said social interaction data based on said associated user generated input and said physical geographic location, and based on said analysis, determining a behavior of the user from said social interaction data that corresponds to the user generated input and said physical geographic location;

logic executed by the processor for identifying, via the computing device, a digital media item comprising digital content provided by a third party, said identification of the third party digital media item based on said determined behavior; and logic executed by the processor for communicating, by the computing device over the network, instructions associated with said third party digital media item to the user device, said instructions comprising modifications to the interactive map interface, said modifications causing a network-connected device associated with the third party to communicate the third party digital media item such that the previously communicated and displayed interactive map interface is dynamically updated and modified to add to the already displayed interactive map the third party digital media item in association with the interactive data object identified by said input.

13. The computing device of claim 12, wherein the behavior of the user is relating to at least one of a keyword, user interaction data, and metadata associated with the user.

14. The computing device of claim 12, wherein the digital content of the selected third party digital media item comprises at least one of text, audio, an image, and video.

15. The computing device of claim 12, wherein the user input further comprises at least one of text, video, and audio.

16. The computing device of claim 12, further comprising:
  logic executed by the processor for generating a function of at least one of at least one of affinity, relevance and semantics from the metadata; and
  logic executed by the processor for using the function as an expression of the behavior of the user.

17. The computing device of claim 12, wherein the function is a social or affinity graph.

18. The computing device of claim 12, wherein the interface shares images or supports personal contacts.

* * * * *